United States Patent [19]
Blount

[11] Patent Number: 5,369,820
[45] Date of Patent: Dec. 6, 1994

[54] TOILET TRAINING POTTY

[76] Inventor: Shirley J. Blount, 3018 Cathy Dr., Durham, N.C. 27703

[21] Appl. No.: 199,601

[22] Filed: Feb. 22, 1994

[51] Int. Cl.⁵ .............................................. A47K 11/00
[52] U.S. Cl. .................................................. 4/483; 4/902
[58] Field of Search ............... 4/314, 479, 483, 661, 4/902; 116/67 R; 340/573

[56] References Cited

U.S. PATENT DOCUMENTS

| | | | |
|---|---|---|---|
| 2,663,861 | 12/1953 | Heath | 4/902 X |
| 2,802,444 | 8/1957 | Gilmour | 4/902 X |
| 3,364,478 | 1/1968 | Waard | 4/483 |
| 3,680,151 | 8/1972 | Boardman et al. | 4/483 X |
| 3,691,980 | 9/1972 | Shastal | 116/67 |
| 4,509,215 | 4/1985 | Paz | 4/452 |
| 4,883,749 | 11/1989 | Roberts et al. | 434/247 |
| 5,123,130 | 6/1992 | Sanders | 4/661 |

*Primary Examiner*—Charles E. Phillips
*Attorney, Agent, or Firm*—Olive & Olive

[57] ABSTRACT

The present invention comprises a potty seat configured with a hinged platform ring upon which a toilet training child is to sit, a collecting basin able to fit within a substantially hollow base of said potty seat, a pair of laterally disposed arms and a simulative tank connecting between the arms toward the rear. A first pair of lights is recessed within the arms of the potty seat. A second light or pair of lights is recessed within the tank portion. A pair of serially connected switches are mounted respectively beneath the platform ring and beneath the collecting basin so as to be closed when a weight is pressed down on each switch and thus electrically connected to activate the first pair of lights. Another switch is connected to a simulated flush handle and, when pivoted by the user, to activate the second light or lights. Thus, the lighting acts to positively respond to the child user carrying on the desired acts and learning proper toilet use.

3 Claims, 1 Drawing Sheet

TOILET TRAINING POTTY

FIELD OF THE INVENTION

This invention relates to children's toilet training apparatus.

BACKGROUND OF THE INVENTION

It is known in the field of psychology that training of an individual is generally more successful if a desired response is followed by a reward than if an undesired response is followed by a punishment. A particular response for which training is universally necessary is that of a child's use of a toilet or of a toilet-simulative device known as a "potty". If this toilet training is difficult for a child, the situation can be stressful for both the child and the parent. Conversely, if this training is easy, the situation can be comparatively pleasant.

In this context, several prior inventions have been directed to this particular training problem, some of which are the subject of issued U.S. Patents. In particular, U.S. Pat. No. 3,691,980 to Shastal for a Musical Potty Chair, U.S. Pat. No. 4,883,749 to Roberts et al. for a Children's Toilet Training Device With Differentiating Means, U.S. Pat. No. 5,008,964 to Dean et al. for a Child's Toilet and U.S. Pat. No. 5,123,130 to Sanders for an Illuminated Commode Training Kit all deal with aspects of this training problem.

The present invention as disclosed below provides a novel potty to aid in the process of training a child in an easy, self-rewarding manner.

SUMMARY OF THE INVENTION

The invention disclosed provides a child's potty with built in response devices in the form of differential illuminating areas to automatically reward a child for proper toilet use. The potty of the invention includes a set of lights in the arms of the potty apparatus which are illuminated when the child is seated on the potty and has eliminated into a collecting basin. A second set of lights in the tank portion of the potty is illuminated when a "flushing" handle is pressed downward by the child user.

DETAILED DESCRIPTION OF THE INVENTION

Figure 1:
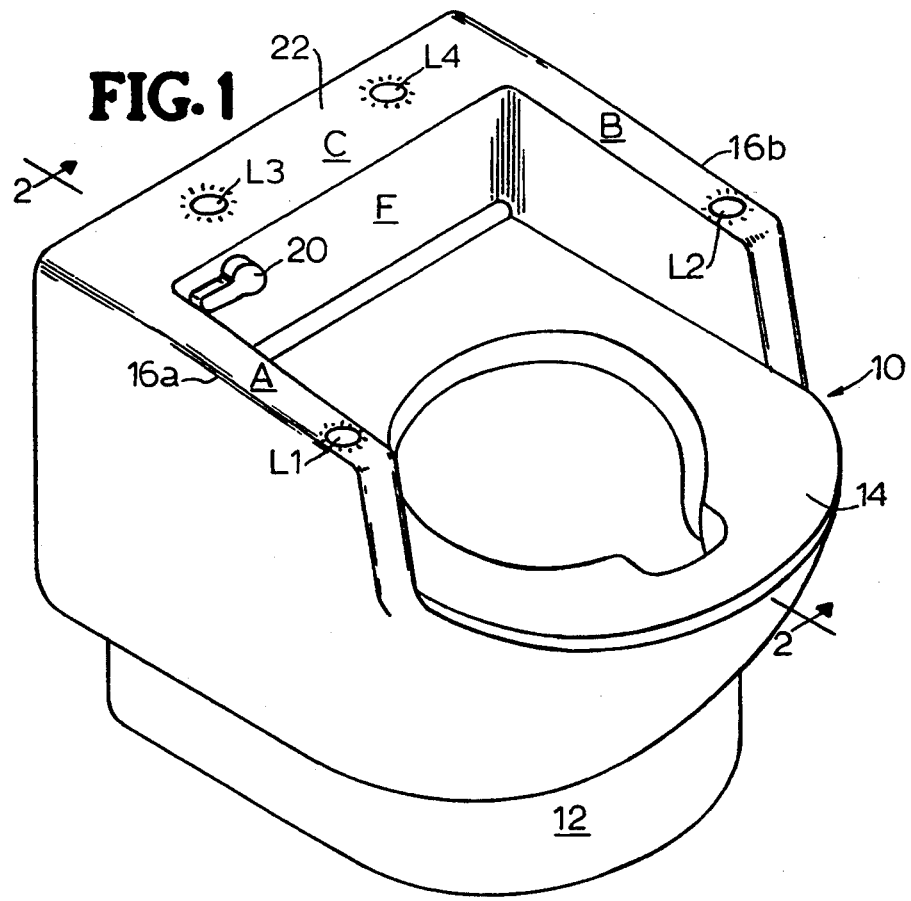
FIG. 1 is a perspective view of the potty of the invention.

The potty 10 of the invention illustrated in FIG. 1 is to some extent similar to molded plastic potties known in the prior art, but with modifications directed to implementing the specific objectives of the present invention.

Potty 10 has a supportive base 12 which is substantially hollow and platform ring 14 which is hingedly connected at its rear edge to the supportive base 12. A pair of substantially hollow arms 16a and 16b are positioned adjacent platform ring 14 and extend upwardly therefrom. A substantially hollow tank portion 22 is connected to and extends between the rear portions of arms 16a, 16b and above and behind base 12. Arms 16a and 16b are configured in the preferred embodiment to be approximately 2 inches in width which is somewhat wider across their respective top surfaces A and B than is typical in arms of previously known potty seats.

Potty 10 is preferable molded of a translucent plastic resin of a thickness so that a light contained within any hollow portion thereof will be visible from the outside when illuminated. One of such lights L1 is contained in arm 16a and a second light L2 in arm 16b, each arm light L1, L2 being in a location adjacent the upper, outer corner of each respective arm. A further pair of lights L3, L4 is positioned within tank portion 22 slightly below the top surface C thereof. A simulated flush handle 20 is provided on the forward facing vertical surface F of tank portion 22 in a pivotable and biased mounting so that it may be rotated downwardly approximately one quarter turn in the direction of arrow A and automatically return to horizontal upon being released.

Figure 2:
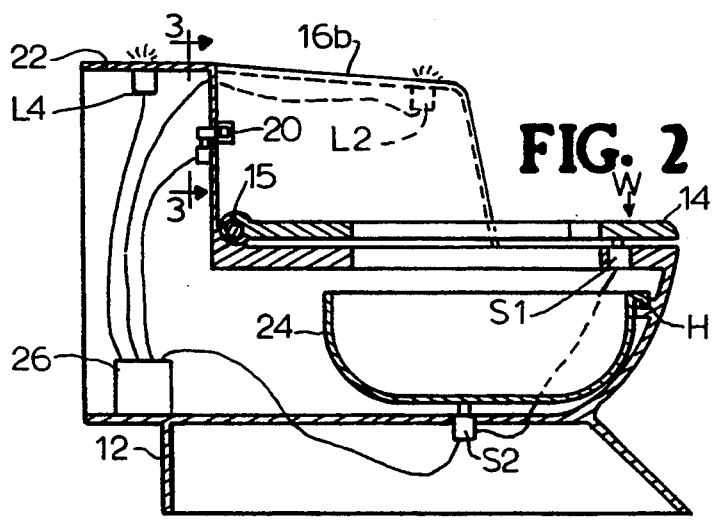
FIG. 2 is a cross sectional elevation view taken in the direction of line 2—2 of FIG. 1.

The main details of the operative mechanism of the invention are seen in FIG. 2. As is common in existing potty seats, a collecting basin 24 fits within the hollow cavity of base 12 beneath the opening in platform ring 14. Platform ring 14 pivots upwardly about hinge 15 at a rear portion of platform ring 14 and rests on first spring loaded switch S1 located beneath its forward end. Basin 24 has hooking means H to connect to an interior wall portion of base 12 so as to allow the opposite end of basin 24 to rest upon second spring loaded switch S2 mounted on the bottom surface of base 12. According to the electrical diagram of FIG. 4, switches S1 and S2 are connected to control box 26 serially, which requires that both switches S1, S2 be closed to cause lights L1, L2 to illuminate.

When the potty 10 is ready for use, seat 14 is raised by spring loaded first switch S1 and collecting basin 24 is raised by second spring loaded switch S2. In the first sequence of operation, when a child sits on seat 14, first switch S1 is mechanically pressed so as to be electrically closed. When the child eliminates into the collecting basin 24, second switch S2 is also mechanically depressed and electrically closed. The electrical circuit of which lights L1, L2 are a part is thus completed.

Figure 4:
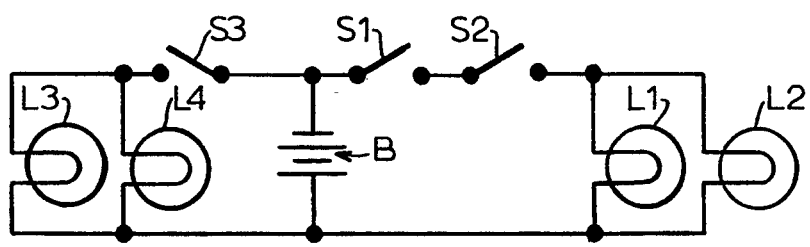
FIG. 4 is a schematic diagram of the electrical circuit of the invention.

Referring now to electrical diagram FIG. 4, power is supplied to the circuit by power source B, for instance a battery adapted to the electrical requirements of the light bulbs used. Switches S1 and S2 are normally open and connected to one side of power source B in series connection. Both switches S1 and S2 must be closed to power lights L1 and L2, which are simultaneously powered through parallel wiring to the opposite side of power source B. Thus, when a child sits on seat 14 and eliminates into basin 24, switches S1 and S2 are closed and lights L1 and L2 both illuminate. It will be appreciated that switch S2 is relatively sensitive compared to switch S1.

Figure 3:
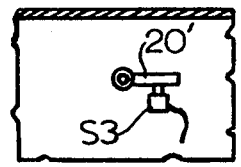
FIG. 3 is a partial sectional view taken in the direction of line 3—3 of FIG. 2.

In the second sequence of use, the child gets off the seat 14 which causes switch S1 to open and lights L1, L2 to go off. The child next manually presses down on and pivots flush handle 20 (FIG. 1), which causes switch S3 (FIGS. 3 and 4) to close and lights L3, L4 to illuminate. As seen in electrical diagram FIG. 4, lights L3, L4 are connected to power source B via a single normally open spring loaded switch S3. According to FIG. 3, showing the rear portion of flush handle 20, switch actuator 20' operates in unison with handle 20. As actuator 20' moves downward, extension 28, normally biased in a counterclockwise direction by the action of spring loaded switch S-3, is moved clockwise to close switch S3 and cause lights L3, L4 to illuminate. When handle 20 is released, the spring loaded switch moves actuator 20' away from switch S3 and lights L3, L4 are deactivated.

As described above, the sequential lighting pattern causes a reward stimulation to the child being trained so as to encourage proper toilet habits. Further embellishments may be added to the preferred embodiment, such as, for example, a time delay switch so that the lights will remain on for a selected period after switch closure or relay requiring that the first lights in the arms were activated before the second lights in the tank portion can be lighted. These and other modifications, variations and embodiments are contemplated, and accordingly. all such variations, modifications, and embodiments are to be regarded as being within the spirit and scope of the invention.

What is claimed is:

1. A potty toilet training apparatus comprising:
   (a) a base having a horizontally disposed opening above a hollow interior collecting basin storage area located within a forward portion of said base and having a rearward base portion extending rearwardly of said forward base portion;
   (b) a horizontally disposed seat hingedly connected to said base .and having a seat opening residing above and aligning with said base opening;
   (c) a pair of upright arm members located on opposite sides of said seat and supported by said base, each said arm member including a hollow arm enclosure having light transparent walls;
   (d) a tank portion extending between said arm members and located above and forming an upward extension of said rearward base portion and including a hollow tank enclosure having a light transparent wall;
   (e) a simulative flush handle located between rearward portions of said arm members and pivotedly mounted on a first wall surface of said tank portion above said seat;
   (f) a pivotally mounted collecting basin located with said base collecting basin storage area;
   (g) a first electrically energized light source located within each of said arm enclosures;
   (h) a second electrically energized light source located within said tank enclosure;
   (i) an electrical power source including means dependent on weight being applied to both said seat and said collecting basin for connecting said power source to said first light source thereby energizing said light source in each said arm enclosure;
   (j) means dependent on said simulative flush handle being pivoted for connecting said power source to said second light source thereby energizing said light source in said tank enclosure: and
   (k) means operative to disconnect said first and second light sources in the absence of said weight being applied and said flush handle being pivoted.

2. A potty toilet training apparatus as claimed in claim 1 wherein said means to energize said first light source when a weight is placed upon said platform ring and a different weight is placed in said collecting basin comprises a plurality of normally open electrical switches mounted in mechanical operational contact with said seat and said collecting basin respectively and electrically connected in series between said power source and said first light source.

3. A potty toilet training apparatus as claimed in claim 1 wherein said means to energize said second light source when said simulative flush handle is pivoted comprises a normally open switch electrically connected between a power source and said second light source.

* * * * *